United States Patent
Alletrux, Marcel Frederic Leopold

[11] 3,957,120
[45] May 18, 1976

[54] HORSESHOE

[76] Inventor: Alletrux, Marcel Frederic Leopold, La Korrigane, Saint-Cyr-l'Ecole, France, 78210

[22] Filed: Feb. 25, 1975

[21] Appl. No.: 553,025

[30] Foreign Application Priority Data
Feb. 28, 1974 France .............................. 74.06920

[52] U.S. Cl. .................................... 168/4; 168/24
[51] Int. Cl.² ............................................. A01L 1/00
[58] Field of Search ................ 168/4, 11, 14, 24, 26

[56] References Cited
UNITED STATES PATENTS

| | | |
|---|---|---|
| 561,217 | 6/1896 | Freyne .................................... 168/4 |
| 652,469 | 6/1900 | Young .................................... 168/4 |
| 738,144 | 9/1903 | Agnew et al. .......................... 168/24 |
| 919,294 | 4/1909 | O'Brien .................................. 168/4 |
| 3,513,915 | 5/1970 | Sherman ......................... 168/DIG. 1 |

FOREIGN PATENTS OR APPLICATIONS 4,993   11/1881   United Kingdom .................... 168/24

Primary Examiner—Louis G. Mancene
Assistant Examiner—Jack Q. Lever
Attorney, Agent, or Firm—Holman & Stern

[57] ABSTRACT

A metallic monoblock horseshoe comprising a thick, rectangular in cross-section, inner portion and a thinner peripheral outer portion, the sole of the hoof resting on the inner portion carrying the horse's weight and the outer portion being secured to the crust.

6 Claims, 2 Drawing Figures

HORSESHOE

The invention relates to a horseshoe.

The usual horseshoes consist of a metal piece covering the lower portion of the wall or crust contacting the ground and which is secured by nails driven into it and traversing the horseshoe through holes or nail-holes.

These horseshoes have disadvantages since they strain the wall and do not prevent skidding.

The horseshoe according to the invention is characterized in that it is constituted by a plate contacting the horse foot plantar face not only by the wall edge but also by the sole, and in that the plate has, projecting on its lower face, a rib portion which is totally or partly opposite to the sole.

With such a horseshoe the wall of the hoof mainly serves for the fixation but weight transmission is almost entirely ensured by the sole.

The invention relates to an embodiment according to which the horseshoe is made of cast aluminum. Its particular configuration permits to take advantage of the malleability of this metal, the upper face of the shoe conforming itself during its life time exactly to the end of the horse foot.

In the following description given by way of example reference is made to the accompanying drawing in which.

Figure 1:
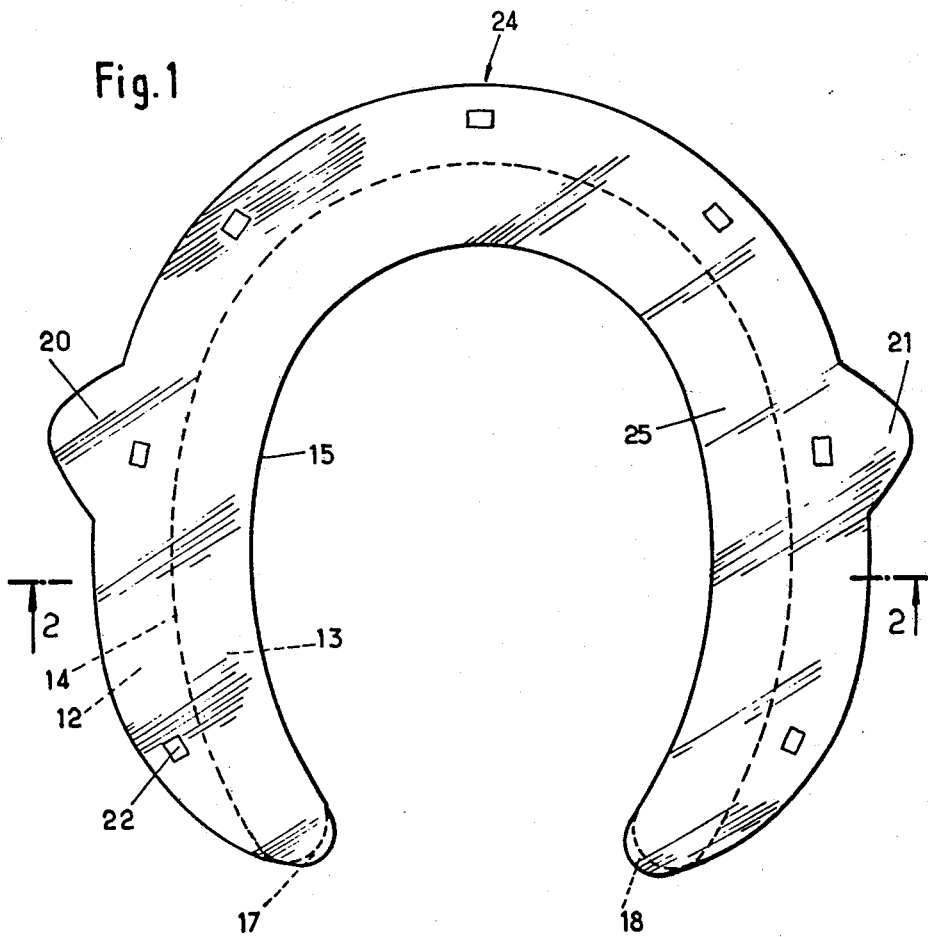
FIG. 1 is a view of the upper face of the shoe.
Figure 2:
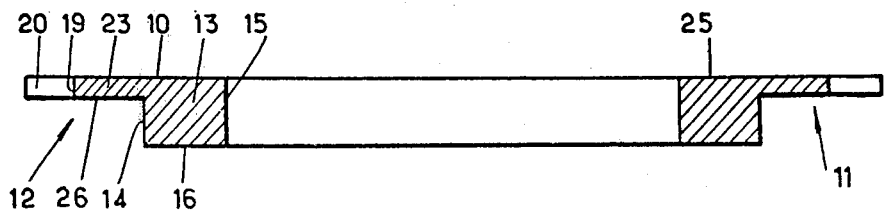
FIG. 2 is a cross-section according to line 2—2 in FIG. 1.

The horseshoe according to the invention is a moulded piece advantageously made of aluminum, but suitably also made of iron, the upper face 10 of which is planar, whereas the lower face 11 has a peripheral portion 12, flat and relatively thin, and a thicker inner portion 13 thereby forming a rib portion delimited by an outer vertical face 14 and an inner vertical face 15 and a lower face 16 parallel to face 10.

The vertical faces 14, 15 are substantially parallel but are joined together at their ends by rounded portions 17 and 18 or heels having a small radius of curvature. The outer edge 19 of the peripheral part 12 is substantially parallel to faces 14 and 15. It may however comprise two lateral appendices 20 and 21 or nips.

The horseshoe according the invention is secured to the horse foot in the wall thereof, therefore under the usual conditions, by driving nails, advantageously with a flat head, into nail-holes 22. The holes are located on the relatively thin annular plate 23 so as to permit securement with the centre portion 24 of the shoe being directed either to the front or to the rear.

The shoes of a same size can be fixed to the four limbs of the horse.

The horseshoe being so secured, the inner part 25, i.e. the part near the face 15, is in contact with the sole. The weight of the animal is thus mainly transmitted by the sole, the more so because at the various paces the rib enters into the soil.

The foot of the animal accomodates the shoe according to the invention in a better way than the usual shoes.

Practice shows that the upper face 10 conforms itself to the horse foot or hoof, and adapts itself to the foot irregularities by taking advantage of the malleability of aluminum.

Appendices 20 and 21 or nips are turned up to improve upon the fixation.

The width of the plate 10 is frequently sufficient for permitting the outer edge thereof to be brought up onto the horse foot.

The horseshoe according to the invention is anti-skidding by its configuration.

In a further embodiment inserts of harder material are embedded into rib 13 to improve upon its strength.

Their lower end advantageously projects slightly from the lower face 16, thereby increasing the anti-skidding properties of the shoe.

What is claimed is:

1. A horseshoe comprising a U-shaped, metallic mono-block structure having a thick inner portion, said inner portion having an upper face, a lower face, lateral inner and outer faces and a transverse section, said transverse section being substantially rectangular; and a thinner outer portion having nail holes for fastening said horseshoe to the crust of a horse hoof, said outer portion having an upper face, an edge and a width, said upper face of said outer portion being an extension of said upper face of said inner portion, said width of said outer portion being sufficient for said upper face of said inner portion to be in contact with only a sole of a horse's foot, and said lateral inner and outer faces of said inner portion being substantially parallel.

2. The shoe as defined in claim 1, wherein said structure is made of cast aluminum.

3. The shoe as defined in claim 1, wherein the outer portion is distortable enough to be adapted to said hoof of said horse.

4. The shoe as defined in claim 1, wherein said width of said outer portion is sufficient to have said edge curled up around said hoof.

5. The shoe as defined in claim 1, wherein inserts of hard metal are embedded in said inner portion.

6. The shoe as defined by claim 5, wherein said inserts project beyond said lower face of said inner portion.

* * * * *